(12) United States Patent
Yoshimitsu

(10) Patent No.: US 7,903,392 B2
(45) Date of Patent: Mar. 8, 2011

(54) SOLID ELECTROLYTIC CAPACITOR AND METHOD OF MANUFACTURING THE SAME

(75) Inventor: Satoru Yoshimitsu, Saga (JP)

(73) Assignees: SANYO Electric Co., Ltd., Moriguchi-shi (JP); Saga Sanyo Industries Co., Ltd., Saga (JP)

( * ) Notice: Subject to any disclaimer, the term of this patent is extended or adjusted under 35 U.S.C. 154(b) by 385 days.

(21) Appl. No.: 12/038,561

(22) Filed: Feb. 27, 2008

(65) Prior Publication Data

US 2008/0204974 A1    Aug. 28, 2008

(30) Foreign Application Priority Data

Feb. 27, 2007  (JP) ................. 2007-047738

(51) Int. Cl.
*H01G 4/32* (2006.01)
*H01G 9/04* (2006.01)

(52) U.S. Cl. ........................................ 361/530; 361/528

(58) Field of Classification Search .......... 361/523–524, 361/528–531
See application file for complete search history.

(56) References Cited

FOREIGN PATENT DOCUMENTS

| JP | 2002-203750 A | 7/2002 |
|----|---------------|--------|
| JP | 2002-252147 A | 9/2002 |
| JP | 2004-164974 A | 6/2004 |
| JP | 2007235105 A * | 9/2007 |

\* cited by examiner

*Primary Examiner* — Eric Thomas
(74) *Attorney, Agent, or Firm* — Westerman, Hattori, Daniels & Adrian, LLP

(57) ABSTRACT

A solid electrolytic capacitor excellent in adhesion to a solid electrolyte with excellent ESR and heat resistance can be provided without reducing the material characteristics of a separator. This solid electrolytic capacitor comprises a capacitor element formed by winding an anodic foil prepared from a chemical conversion foil obtained by anodizing a metal having a valve action and a counter cathodic foil through a separator and a solid electrolyte employed as an electrolyte, while the separator is prepared from aramid fiber, and a silane coupling agent adheres to voids of the aramid fiber.

2 Claims, 1 Drawing Sheet

SOLID ELECTROLYTIC CAPACITOR AND METHOD OF MANUFACTURING THE SAME

BACKGROUND OF THE INVENTION

1. Field of the Invention

The present invention relates to a solid electrolytic capacitor and a method of manufacturing the same, and more particularly, it relates to a wound type solid electrolytic capacitor and a method of manufacturing the same.

2. Description of the Background Art

With the recent digitization and increase in frequency of electronic equipment and the increase in the temperature for reflow soldering with lead-free solder, a miniature high-volume capacitor excellent in low impedance characteristics in a high-frequency domain and heat resistance is required.

Such requirements for miniaturization, increase in volume and low impedance characteristics in a high-frequency domain can be satisfied by a wound type electrolytic capacitor obtained by storing a capacitor element formed by winding a cathodic foil and an anodic foil through a separator in a metal case and sealing the same with sealing rubber. A solid electrolytic capacitor having a solid electrolytic layer made of a conductive polymer such as polypyrrole or polythiophene exhibiting excellent conductivity is provided.

Such a solid electrolytic capacitor is subjected to reflow soldering with lead-free solder, having a melting point considerably higher than that of conventional lead solder, at a high temperature of 200 to 270° C. If the solid electrolytic capacitor having the electrolyte of the conductive polymer such as polypyrrole or polythiophene is subjected to reflow soldering under such a temperature condition, swelling of the sealing rubber or the metal case or deterioration of various electric characteristics disadvantageously excessively progresses due to cracked gas resulting from deterioration of the conductive polymer.

It has been recognized that the cracked gas results from deterioration of the conductive polymer for the following reason: Thermal decomposition of synthetic cellulose made from natural fiber generally used for the separator starts from a temperature of about 150° C., and deterioration of the conductive polymer acceleratedly progresses due to this decomposition, to generate the cracked gas.

Therefore, employment of aramid fiber which is an organic polymer having a high coefficient of elasticity and excellent heat resistance as a separator is proposed (refer to Japanese Patent Laying-Open Nos. 2002-203750 and 2002-252147, for example).

However, a solid electrolytic capacitor having a separator of aramid fiber is inferior in adhesion between a conductive polymer employed as a solid electrolyte and the separator. Consequently, equivalent series resistance (hereinafter abbreviated as ESR) is disadvantageously increased.

The aramid fiber has high strength, a high coefficient of elasticity and high heat resistance due to properties such as high orientation. However, the surface of the aramid fiber is so inactive that the interface between the aramid fiber and a polyelectrolyte is inferior in strength or adhesion. According to a method of activating the inactive surface of the aramid fiber (refer to Japanese Patent Laying-Open No. 2004-164974, for example), the heat resistance of the aramid fiber is reduced due to chemical treatment. Consequently, the material characteristics of the aramid fiber for serving as the separator of a solid electrolytic capacitor are remarkably reduced.

SUMMARY OF THE INVENTION

In consideration of the aforementioned problems, an object of the present invention is to provide a solid electrolytic capacitor excellent in adhesion on the interface between a separator and a solid electrolyte, having low ESR and excellent heat resistance.

In order to solve the aforementioned problems, the present invention provides a solid electrolytic capacitor comprising a capacitor element formed by winding an anodic foil provided with a dielectric film and a counter cathodic foil through a separator and impregnated with a solid electrolyte, characterized in that a silane coupling agent adheres to fiber constituting the separator. This separator is preferably constituted of aramid fiber.

The present invention also provides a method of manufacturing a solid electrolytic capacitor, comprising the step of winding an anodic foil provided with a dielectric film and a counter cathodic foil through a separator, and further comprising the step of dipping the separator in a solution containing a silane coupling agent in advance of the step of winding the anodic foil and the counter cathodic foil through the separator.

In the solution containing the silane coupling agent, a supercritical fluid is preferably employed as a solvent.

The method further the step of performing heat treatment on the separator in a vacuum after the step of dipping the separator in the solution containing a silane coupling agent. The temperature for the heat treatment is preferably 80 to 200° C.

The separator according to the present invention is so employed that a solid electrolytic capacitor excellent in heat resistance and ESR can be provided without damaging the characteristics of the separator.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 1:
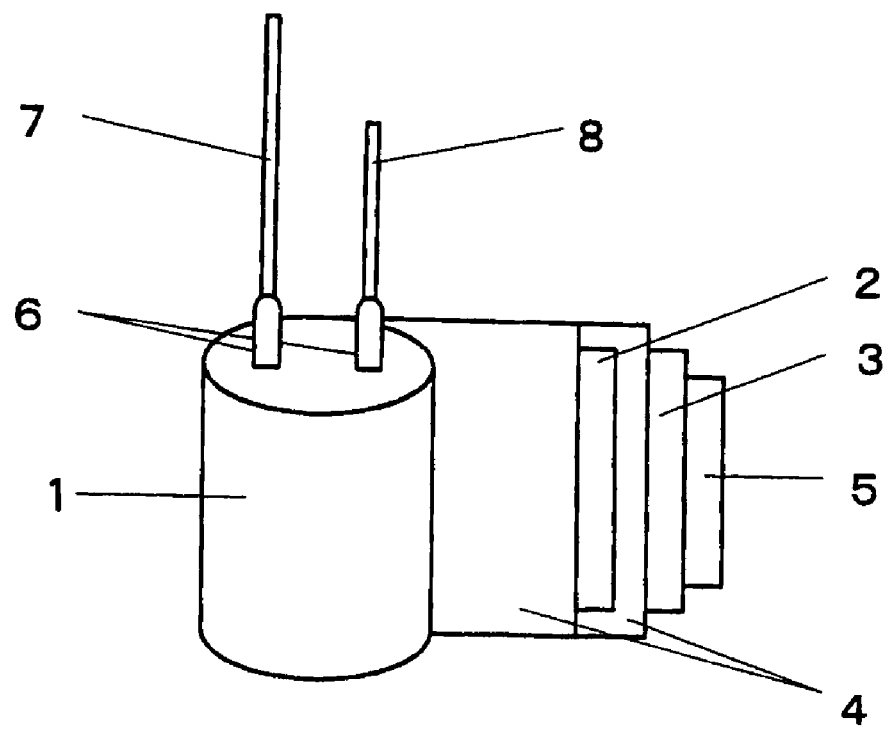
FIG. 1 is a sectional view of a capacitor element of a solid electrolytic capacitor according to an embodiment of the present invention.

FIG. 1 is a sectional view of a capacitor element of a solid electrolytic capacitor according to the embodiment of the present invention. An anodic foil 2 made of a valve action metal such as aluminum and provided with an oxide film layer on the surface thereof and a cathodic foil 3 are wound through a separator 4 and fixed with a sealing tape 5, thereby forming a capacitor element 1. An anode lead wire 7 and a cathode lead wire 8 are connected to anodic foil 2 and cathodic foil 3 respectively.

Separator 4 is made of aramid fiber containing a silane coupling agent adhering to filaments. This aramid fiber is not particularly restricted so far as the same is prepared from total paraaromatic polyamide, and may be in the form of spun continuous fiber or single fiber cut after spinning. The thickness of separator 4 is preferably 20 to 60 μm. The insulation resistance of the solid electrolytic capacitor is reduced if the thickness of separator 4 is less than 20 μm, while the ESR of the solid electrolytic capacitor may be increased if the thickness of separator 4 is in excess of 60 μm. The density of separator 4 is preferably 0.2 to 0.7 g/cm$^3$. The tensile strength is insufficient if the density of separator 4 is less than 0.2 g/cm$^3$, while the capacitance may be reduced and the ESR may be increased if the density of separator 4 is in excess of 0.7 g/cm$^3$. Further, the tensile strength of separator 4 is preferably at least 0.8 kgf/15 mm, more preferably at least 1.5 kgf/15 mm. If less than 0.8 kgf/15 mm, the tensile strength may be insufficient for separator 4 to be wound with anodic and cathodic foils 2 and 3.

The silane coupling agent can be prepared from a compound selected from generally employed γ-(2-aminoethyl) aminopropyltrimethoxysilane, γ-(2-aminoethyl)aminopropylmethyldimethoxysilane, γ-methacryloxypropyltrimethoxysilane, γ-glycidoxypropyltrimethoxysilane, γ-mercaptopropyltrimethoxysilane, methyl trimethoxysilane, methyl triethoxysilane, vinyl triacetoxysilane, γ-chloropropyltrimethoxysilane, γ-anilinopropyltrimethoxysilane, vinyl trimethoxysilane, γ-chloropropylmethyldimethoxysilane, γ-mercaptopropylmethyldimethoxysilane, methyl trichlorosilane, dimethyldichlorosilane, trimethylchlorosilane and the like. In particular, γ-(2-aminoethyl)aminopropyltrimethoxysilane is preferable.

The aramid fiber is dipped in an aqueous solution or an emulsion containing the silane coupling agent or a supercritical fluid so that the silane coupling agent adheres to voids of the aramid fiber, while the supercritical fluid is preferably employed in order to improve the effect. The term "supercritical fluid" denotes a fluid in a state exceeding the limit temperature/pressure (critical point) allowing coexistence of a gas and a liquid, having the characteristics of both of the liquid and the gas. The supercritical fluid freely flows and infiltrates into another object due to the dissolubility of the liquid and the excellent dispersibility of the gas. When the aramid fiber is treated in the supercritical fluid, the agent can largely infiltrate into deeper portions of the voids as compared with a case where the aramid fiber is treated in a general solvent, due to the characteristics of the supercritical fluid. The supercritical fluid is formed only under a high pressure, whereby the agent can effectively infiltrate into the voids when the aramid fiber is treated in the supercritical fluid. Further, the supercritical fluid is vaporized under a low temperature, to hardly cause environmental problems.

While the supercritical fluid can be prepared from water, carbon dioxide, alcohol or ammonia, carbon dioxide is preferably employed in consideration of easiness in handling and the cost.

The aramid fiber constituting separator 4 is preferably dipped in the supercritical fluid containing the silane coupling agent, dried and thereafter heat-treated in a vacuum. The crystalline size of the silane coupling agent is increased and intercrystalline clearances are narrowed by this heat treatment, so that the silane coupling agent can sufficiently bond and adhere to the aramid fiber. The heat treatment is preferably performed in the temperature range of 80 to 200° C. If the heat treatment is insufficient, moisture may remain in the aramid fiber to cause deterioration of a solid electrolyte upon reflow soldering of the solid electrolytic capacitor. Further, a cracked gas generated from the solid electrolyte may swell a sealing rubber packing or an armoring case described later.

When the aforementioned treatment and the heat treatment in a vacuum are performed, the silane coupling agent can not only infiltrate into the clearances of the aramid fiber but also seal the clearances between the filaments of the aramid fiber as intercalations, so that the aramid fiber has a low moisture content. In the treatment with the silane coupling agent and the heat treatment, the silane coupling agent and the aramid fiber are not chemically bonded to each other but the silane coupling agent infiltrates into the aramid fiber through spatial changes of physical intercrystalline clearances, whereby the physical properties specific to the aramid fiber can be maintained.

The aforementioned capacitor element 1 is impregnated with a solution containing at least a monomer and an oxidizer and heat-treated, to be provided with the solid electrolyte. While the monomer is not particularly restricted so far as the same is heterocyclic and can form a conductive polymer, 3,4-ethylene dioxythiophene, pyrrole, aniline or a derivative thereof is preferable due to the excellent conductivity thereof.

Figure 2:
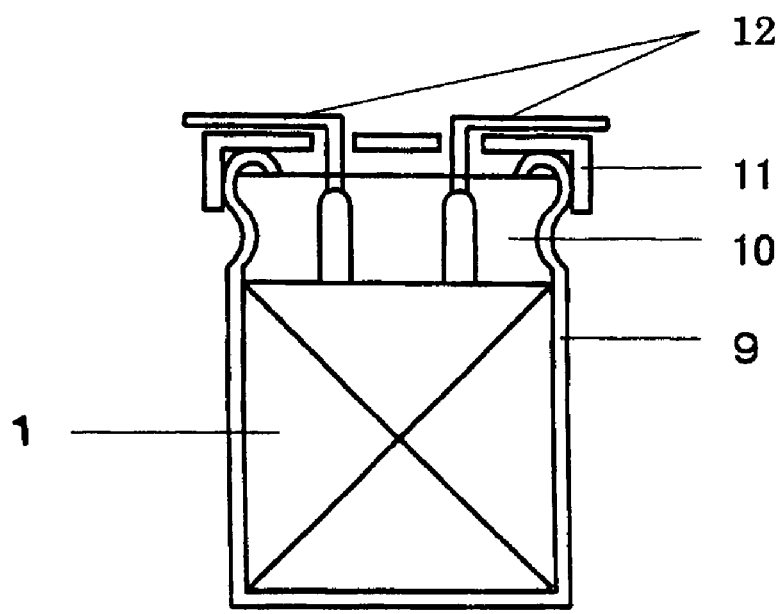
FIG. 2 is a sectional view of the solid electrolytic capacitor according to the embodiment of the present invention.

Referring to FIG. 2, capacitor element 1 provided with the solid electrolyte is stored in an aluminum armoring case 9 in the form of a bottomed cylinder mounted with a sealing rubber packing 10 while lead tab terminals 6 are mounted on the bases of anode lead wire 7 and cathode lead wire 8 respectively. An opening of armoring case 9 is transversely drawn and curled for sealing capacitor element 1, which in turn is aged. Thereafter a plastic plate 11 is inserted into the curled portion, and anode and cathode lead wires 7 and 8 of capacitor element 1 are pressed and folded as electrode terminals 12, for completing the solid electrolytic capacitor according to this embodiment.

EXAMPLES

Examples of the present invention are now described.

Example 1

Treatment of Aramid Fiber with Silane Coupling Agent

Aramid fiber for forming a separator was dipped in a solution prepared by dissolving γ-(2-aminoethyl)aminopropyltrimethoxysilane employed as a silane coupling agent in distilled water at the ratio of 2.0 wt. %. Thereafter moisture was removed with a freeze drier, for preparing a treating agent.

The aramid fiber was dipped in a carbon dioxide fluid atmosphere containing the treating agent prepared in the aforementioned manner, and preserved at the room temperature for two months.

The aramid fiber was in the form of single fiber cut after spinning, with a thickness of 50 μm.

Preparation of Solid Electrolytic Capacitor

Referring to FIGS. 1 and 2, an anodic foil 2 was prepared from an aluminum foil subjected to etching and chemical conversion, wound on a cylinder along with a counter cathodic foil 3 through a separator 4 of the aramid fiber surface-treated in the aforementioned manner and fixed with a sealing tape 5, thereby forming a capacitor element 1. Lead tab terminals 6, an anode lead wire 7 and a cathode lead wire 8 were connected to anodic foil 2 and cathodic foil 3 respectively.

Then, a cut area of capacitor element 1 was chemically converted and heat-treated at 280° C. Then, capacitor element 1 was dipped in 40 wt. % of ferric p-toluenesulfonate containing n-butyl alcohol as a diluent and 3,4-ethylene dioxythiophene, and a conductive polymer layer was thereafter formed between the electrodes of capacitor element 1. A sealing rubber packing 10 was inserted into capacitor element 1, which in turn was stored in an armoring case 9, an opening of armoring case 9 was transversely drawn and curled for sealing capacitor element 1, and capacitor element 1 was aged. A plastic plate 11 was inserted into the curled surface of armoring case 9, and anode lead wire 7 and cathode lead wire 8 of capacitor element 1 were pressed and folded as electrode terminals 12, for completing a solid electrolytic capacitor.

Example 2

A solid electrolytic capacitor was prepared similarly to Example 1, except that a separator 4 was heat-treated in a vacuum at a temperature of 170° C. for 30 minutes after treatment of aramid fiber with a silane coupling agent.

Comparative Example 1

A solid electrolytic capacitor was prepared similarly to Example 1, except that aramid fiber was not treated with a silane coupling agent.

Comparative Example 2

A solid electrolytic capacitor was prepared similarly to Example 2, except that aramid fiber was not treated with a silane coupling agent but subjected to only heat treatment in a vacuum at a temperature of 170° C. for 30 minutes.

As to the solid electrolytic capacitors prepared according to Examples 1 and 2 and comparative examples 1 and 2, capacitances (initial capacitances) at a frequency of 120 kHz, ESR values (initial ESR values) at a frequency of 100 kHz, capacitance loss factors before and after reflow soldering, ESR changes before and after a reflow test and numbers of appearance defectives were obtained. Assuming that $C_0$ [µF] represents the initial capacitance and C [µF] represents the capacitance after reflow soldering, the capacitance loss factor ΔC [%] is obtained as follows:

$$\Delta C = (C - C_0)/C_0 \times 100 \quad (1)$$

Assuming that $R_0$ [mΩ] represents the initial ESR and R [mΩ] represents the ESR after reflow soldering, the ESR change ΔR is obtained as follows:

$$\Delta R = R/R_0 \quad (2)$$

The reflow test was conducted at a temperature of at least 230° C. with the maximum temperature of 250° C. for at least 30 seconds. Table 1 shows the results of the reflow test.

TABLE 1

| | Initial Capacitance [µF] | Initial ESR [mΩ] | Capacitance Loss Factor [%] | ESR Change [times] |
|---|---|---|---|---|
| Example 1 | 151 | 29.3 | −2.8 | 1.01 |
| Example 2 | 152 | 29.7 | −3.0 | 1.07 |
| Comparative Example 1 | 151 | 32.3 | −4.9 | 1.43 |
| Comparative Example 2 | 150 | 32.9 | −4.8 | 1.23 |

It is understood from Table 1 that the initial ESR values are remarkably small and the ESR changes before and after reflow soldering are also small in the solid electrolytic capacitors according to Examples 1 and 2 treated in the supercritical fluids as compared with the untreated solid electrolytic capacitor according to comparative example 1 and the solid electrolytic capacitor according to comparative example 2 not treated in a supercritical fluid. Comparing the solid electrolytic capacitors according to Examples 1 and 2 with those according to comparative examples 1 and 2, it is also understood that the initial capacitances of these solid electrolytic capacitors are substantially equivalent to each other while the capacitance losses before and after reflow soldering are smaller in the solid electrolytic capacitors according to Examples 1 and 2 than those according to comparative examples 1 and 2. Thus, it is understood that the solid electrolytic capacitor according to the present invention is excellent in heat resistance.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising a capacitor element formed by winding an anodic foil provided with a dielectric film and a counter cathodic foil through a separator and impregnated with a solid electrolyte, wherein
   said separator is constituted of aramid fiber, and
   a silane coupling agent is infiltrated into said aramid fiber.

2. The solid electrolytic capacitor according to claim 1, wherein said aramid fiber is formed by treating in a supercritical fluid containing said silane coupling agent so that said silane coupling agent infiltrates into said aramid fiber.

\* \* \* \* \*